United States Patent [19]

Fischbach

[11] Patent Number: 4,625,361
[45] Date of Patent: Dec. 2, 1986

[54] SPRING CLIP FASTENING STRUCTURE FOR SECURING HANDLE TO UTENSIL

[75] Inventor: Wolfgang Fischbach, Daaden, Fed. Rep. of Germany

[73] Assignee: Heinrich Baumgarten KG Spezialfabrik fuer Beschlagteile, Neunkirchen, Fed. Rep. of Germany

[21] Appl. No.: 707,317

[22] Filed: Mar. 1, 1985

[30] Foreign Application Priority Data

Mar. 1, 1984 [DE] Fed. Rep. of Germany ....... 3407503

[51] Int. Cl.[4] .............................................. B25G 3/24
[52] U.S. Cl. ............................ 16/114 A; 16/DIG. 24; 403/329
[58] Field of Search ............ 16/110 A, 114 R, 114 A, 16/DIG. 24; 403/329; 294/27.1, 31.1

[56] References Cited

U.S. PATENT DOCUMENTS

| | | | |
|---|---|---|---|
| 3,883,169 | 5/1975 | Fischbach | 294/31.1 |
| 4,019,221 | 4/1977 | Baumgarten | 16/114 A |
| 4,179,146 | 12/1979 | Fischbach | 16/114 A X |
| 4,390,200 | 6/1983 | Fischbach | 16/114 A |

FOREIGN PATENT DOCUMENTS

| | | |
|---|---|---|
| 2729269 | 11/1982 | Fed. Rep. of Germany . |
| 7609915 | 3/1977 | Netherlands ...................... 16/110 A |

*Primary Examiner*—Fred Silverberg
*Attorney, Agent, or Firm*—Flynn, Thiel, Boutell & Tanis

[57] ABSTRACT

A handle fastening structure on a utensil. A support bracket is provided which projects from a utensil wall. The handle member has a recess therein opening toward the utensil wall and which receives the support bracket therein. The support bracket has an attachment extending at an angle with respect to the utensil wall. At least one shoulder projects into the recess of the handle member, which shoulder in the assembled condition of the handle grips behind the attachment of the support bracket. Furthermore, in the recess of the handle member there is arranged a spring which forms an abutment, which spring cooperates with a contact surface of the support bracket and during movement of the handle onto the support bracket is tensioned and effects the securement of the handle and utensil to one another.

5 Claims, 5 Drawing Figures

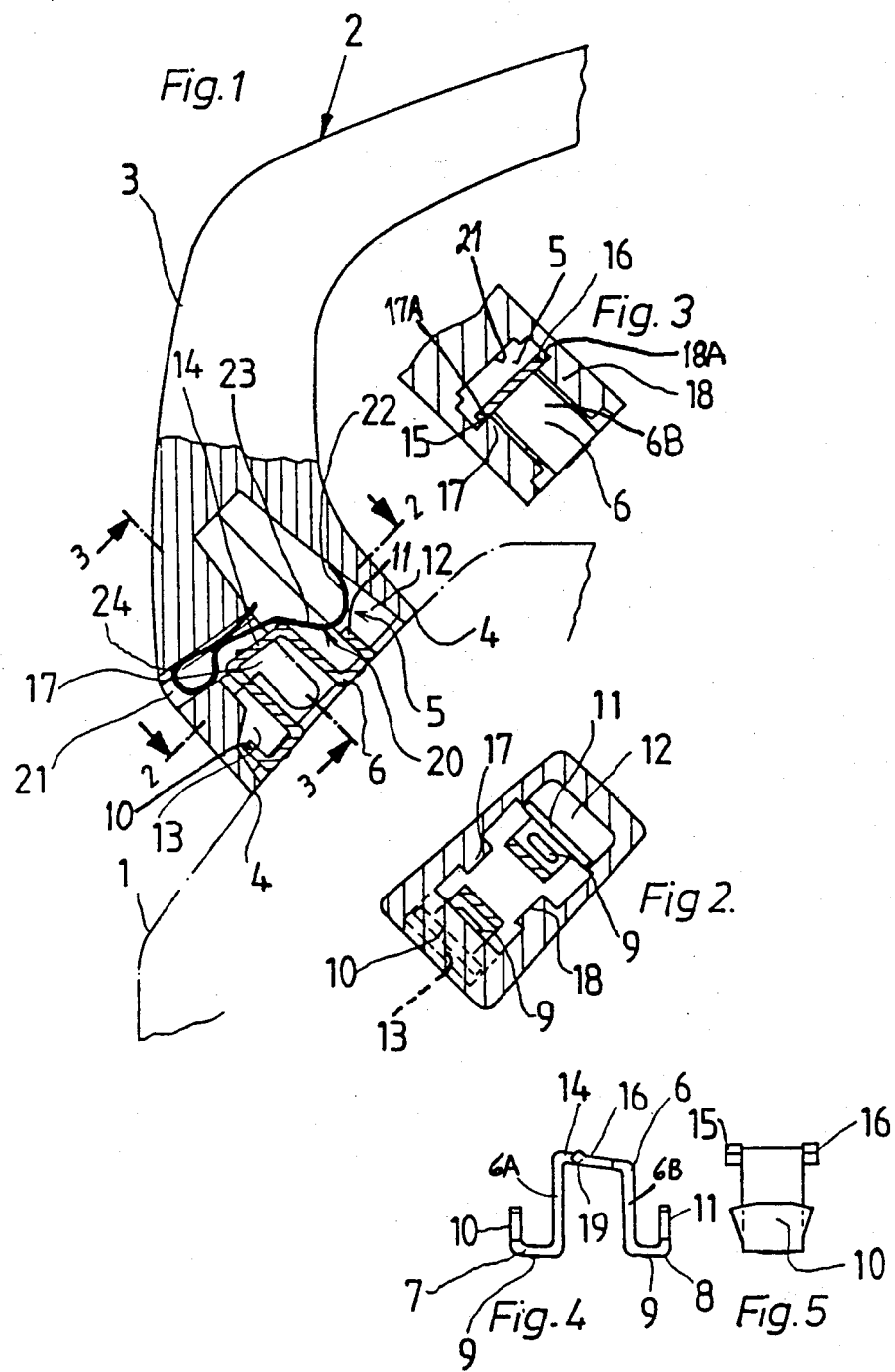

SPRING CLIP FASTENING STRUCTURE FOR SECURING HANDLE TO UTENSIL

FIELD OF THE INVENTION

This invention relates to a handle fastening structure and, more particularly, to a support bracket weldably secured to a utensil and on which a handle is releasably secured.

BACKGROUND OF THE INVENTION

A handle fastening structure is known from German Pat. No. 27 29 269 (which corresponds to U.S. Pat. No. 4,179,146). Here the spring is constructed as a locking bar, whereby for fastening of the handle, the spring is attached to the support bracket in such a manner that the shoulder of the handle member grips behind the attachment. The handle is subsequently rotated around the hook, whereby the spring is tensioned through a first inclined surface and thereafter snaps in behind a second inclined surface. The spring applies a force onto the handle, the component of which force extends parallel with respect to the utensil wall, and presses the handle, on the one hand perpendicularly against the utensil wall and prevents, on the other hand, the handle from being released from the utensil in a direction which is opposite to the common direction of the applied load between utensil and handle. In this known handle, the spring does not only carry out a locking function between support bracket and handle, but moreover has the task of supporting at least partially the weight of the utensil.

Based on this double function of the spring, the spring must be capable of absorbing lasting high spring forces, which requires a strong spring in which, due to the small space conditions inside the handle, only a limited amount of spring deflection can be obtained.

The basic purpose of the invention is to provide a handle fastening structure of the abovementioned type such that the entire supporting function, namely the transfer of the forces from the utensil to the handle, occurs directly through the support bracket, whereby the spring has only the function of effecting a securement of the support bracket and handle to one another.

In a utensil fastening structure according to the invention, the support bracket is provided with attachments, which project over shoulders which are provided on the handle member, whereby advantageously these shoulders are constructed with at least the same inclination as the attachments. To connect the utensil and handle, only the recess of the handle must be positioned to receive the support bracket therein. The recess is structured to have excessive play in lateral direction so that the handle can be moved with respect to the support bracket parallel with respect to the utensil surface a specified distance so that the attachments on the support bracket grip over the shoulders on the handle and in this manner create a positive, form-locking connection between the support bracket and the handle and thus between handle and utensil. The spring, which is also arranged in the recess of the handle and extends substantially parallel with respect to the utensil wall, thus does not need to transmit any forces from the utensil to the handle. This spring has only the function of holding the handle and the support bracket in the locked and engaged position, so that the form-closed connection of the handle and the support bracket is maintained. The spring engages for this purpose, following the shifting movement of the handle parallel to the wall of the utensil, behind a contact surface on the support bracket, so that the handle and support bracket and thus the utensil are secured to one another.

If a removal of the handle from the utensil is desired, the spring can be pulled with a suitable tool out through an opening, which extends from outside to the interior of the handle, out of the handle recess. For example, a commercial screw driver can be utilized. With a suitable spring arching, the handle can also be moved back against the spring tension. The handle is thereafter again movable relative to the support bracket. The support bracket, which is constructed substantially U-shaped, has two laterally pulled-up legs, the width of which are conformed to the width of the recess in the handle member. The legs, which rest on the inner walls of the handle recess, are spaced from one another a sufficient distance so that they act as a lock preventing relative rotation between the handle and the utensil. Thus the spring has only the purpose of securing the handle and the support bracket to one another.

BRIEF DESCRIPTION OF THE DRAWINGS

One exemplary embodiment of the invention will be described in greater detail hereinafter with reference to the drawing, in which:

FIG. 1 is a partially sectioned side view of a handle which is secured to a utensil;

FIG. 2 is a cross-sectional view taken along the line II—II of FIG. 1;

FIG. 3 is a cross-sectional view taken along the line III—III of FIG. 1; and

FIGS. 4 and 5 are a side view and a front view, respectively, of a support bracket.

DETAILED DESCRIPTION

The handle assembly 2 which is to be secured to a utensil 1 consists of a handle member 3 having an abutment surface 4 abutting the sidewall of the utensil 1. A recess 5 is formed into the handle member 3, the cross section of which recess is constructed for receiving a support bracket 6 secured to the utensil 1.

More specifically, the recess 5 of the handle member 3 is generally rectangular in cross-section having a pair of elongated shoulders 17 and 18 extending inwardly into the recess from each of the longer walls of the recess, the elongation of which is in a direction perpendicular to the plane of the abutment surface 4. The shoulders are oriented about midway between the two shorter walls of the recess. A chamber 12 or the like is formed in one of the shorter walls of the recess 5 while a further chamber 13 is formed in the other shorter wall. A rectangular shaped opening 21 (FIG. 3) is provided in the handle and passes through the inner end of the chamber 13 and into the recess 5. The opening 21 is wider than the spacing between the shoulders 17 and 18 so that a shelf-like surface 17A and 18A (FIG. 3) is formed on the inner end of each of the shoulders. The longitudinal axis of the opening 21 extends at an acute angle to the plane of the abutment surface 4.

The support bracket 6 is illustrated in a side view and in a front view, respectively, in FIGS. 4 and 5. The support bracket 6 is constructed substantially U-shaped and has two fastening plates 7,8 which extend generally at a right angle to the legs 6A and 6B of the U. Each plate 7,8 has a welding protuberance 9 for facilitating a weld fastening to the sidewall of the utensil 1 as shown in FIGS. 4 and 5. End sections 10,11 are provided on the free ends of the plates 7,8 and extend at 90° upwardly or away from the sidewall of the utensil. The width of the end sections 10,11 are conformed to the width of the chambers 12 and 13 of the recess 5. Thus, the end sections 10,11, which are spaced a distance from one another, form a lock preventing relative rotation between the handle 2 and the support bracket 6. Two attachments 15,16 are formed on both sides of a crosswise extending or bight portion 14 of the U-shaped support bracket 6 and are coplanar with the bight portion. The plane of the crosswise extending bight portion is inclined relative to a plane containing the fastening plates 7,8. Thus, the attachments, too, are inclined to the plane of the fastening plates 7,8 and are conformed to the inclination of the surface of the shelflife surfaces 17A and 18A in the recess 5 of the handle member. In order to make movement of the attachments 15,16 onto these surfaces easier, the same or left end 19 of each attachment is slightly inclined to the plane of the bight portion 14.

A leaf spring 20 is arranged in the recess 5, which spring extends substantially parallel with respect to the sidewall surface of the utensil 1. One end of the spring is tightly held in the opening 21 in the handle member 3. The other free end 22 extends into the recess 5 and is flexibly movable. The free end 22 is slightly arched forming a sloped part 23 engaging the support bracket 6.

During an assembly of the handle 2 onto the utensil, the handle 2 is, in FIG. 1, first shifted completely to the left with respect to the utensil, so that the end section 11 of the support bracket 6 lies near the right wall of the chamber 12 of the recess 5 (See FIG. 2). During an urging or pressing of the abutment surface 4 of the handle 2 against the sidewall of the utensil, the spring 20 rests with its sloped part 23 on the bight portion 14 of the support bracket 6 and is thereby tensioned. The handle 2 is subsequently shifted to the right relative to the utensil in this pressed-on position, namely until the spring 20 can with its sloped part 23 snap in behind the support bracket, that is, the right side thereof, as illustrated in FIG. 1. In this position the attachments 15,16 of the support bracket 6 rest on the shelflike surfaces 17A and 18A as this can be taken from FIGS. 1 and 3. Forces, which are now applied on the handle, are transferred directly from the shoulders 17 and 18 to the attachments 15,16 and the support bracket 6 onto the utensil 1. The end sections 10,11 of the support bracket serve also as a lock preventing handle rotation, so that torque applied to the handle is absorbed directly by the support bracket. The spring 20 thus has only the function of holding the handle and support bracket in the position which is illustrated in FIG. 1. By suitably forming the sloped part 23 of the spring 20, it can moreover be assured that the handle also cannot be moved or shifted to the left again against the force of the spring parallel to the utensil in order to inadvertently release same. If a release of the handle 2 from the utensil 1 is desired, this is done by introducing a tool into the opening 21 and engaging the loop 24 of the spring 21. Thereafter, the spring as a whole is pulled through the recess 21 out of the handle. Then, and only then, can the handle 2 be moved relative to the utensil and removed therefrom.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a handle fastening structure for use on a utensil, said structure comprising:
    (a) a support bracket fixedly secured to and projecting from a wall of said utensil, said support bracket having at least one leg fastened to said utensil and a crosswise extending portion;
    (b) a handle member having a recess therein which opens toward and along an axis perpendicular to said wall of said utensil, said recess receiving therein said support bracket;
    (c) an attachment means on said support bracket which extends at an angle with respect to said wall of said utensil,
    (d) at least one shoulder in said recess of said handle member extending lengthwise in said recess and which, in the mounted condition of the handle, grips behind said attachment means on said support bracket;
    (e) a spring forming an abutment and is arranged in said recess of said handle member, said spring cooperating with a contact surface on said support bracket and during assembly of said handle member onto said support bracket is tensioned to secure said handle and said utensil to one another, the improvement comprising wherein said spring is an elongate leaf spring having a longitudinal axis extending substantially parallel with respect to said wall of said utensil and perpendicular to said axis of said recess in said handle member, wherein one end of said elongate leaf spring is fixedly held in said handle member and the other end of said spring is arranged freely flexibly movable in said recess, said crosswise extending portion on the support bracket having a length less than the length of said recess, said support bracket being initially received in said recess and oriented to one side of said recess, wherein said freely flexibly movable end of said spring is initially oriented in engagement with said crosswise extending portion and being flexed in a direction perpendicular to said longitudinal axis of said spring, wherein said recess in said handle member includes means for permitting said handle member to be movable in a first direction parallel with respect to said wall of said utensil a finite distance and wherein during said movement in said first direction, said freely flexibly movable end of said spring is permitted to move in a locking direction perpendicular to said longitudinal axis thereof and out of engagement with said crosswise extending portion to grip behind the contact surface at one end of said crosswise extending portion to prevent a movement of said handle member in a second direction parallel to said wall of said utensil and opposite said first direction and in this manner effect a securement of said handle and said utensil to one another.

2. The handle fastening structure according to claim 1, wherein said support bracket is U-shaped and has two legs with sidewardly extending fastening plates, and wherein end sections of said fastening plates are bent approximately at 90° C. upwardly and are conformed in their width to the width of said recess.

3. The handle fastening structure according to claim 2, wherein laterally on said crosswise extending portion of said support bracket there are provided said attachment means having at least the same inclination as said shoulder arranged in said recess.

4. The handle fastening structure according to claim 1, wherein said end of said spring fixedly held in said handle member is freely accessible through an opening which extends to the outside of said handle member to facilitate a removal of said spring therethrough.

5. The handle fastening structure according to claim 4, wherein said end of said spring fixedly held in said handle member is constructed in the form of a loop.

* * * * *